United States Patent
Morita et al.

(10) Patent No.: US 11,837,408 B2
(45) Date of Patent: Dec. 5, 2023

(54) DIELECTRIC MATERIAL, CERAMIC ELECTRONIC DEVICE, MANUFACTURING METHOD OF DIELECTRIC MATERIAL, AND MANUFACTURING METHOD OF CERAMIC ELECTRONIC DEVICE

(71) Applicant: TAIYO YUDEN CO., LTD., Tokyo (JP)

(72) Inventors: Koichiro Morita, Takasaki (JP); Yasuhiro Matsumoto, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 136 days.

(21) Appl. No.: 17/551,052

(22) Filed: Dec. 14, 2021

(65) Prior Publication Data

US 2022/0223346 A1 Jul. 14, 2022

(30) Foreign Application Priority Data

Jan. 13, 2021 (JP) .................................. 2021-003742

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2009/0310279 A1* | 12/2009 | Sasabayashi | ........ | H01G 4/1227 361/321.4 |
| 2015/0036264 A1* | 2/2015 | Morita | ................ | C04B 35/4682 361/321.4 |
| 2016/0268045 A1* | 9/2016 | Kaneko | ..................... | H01G 4/30 |
| 2017/0287636 A1* | 10/2017 | Sakurai | ................... | H01G 4/248 |
| 2019/0279816 A1* | 9/2019 | Taniguchi | .............. | H01G 4/228 |
| 2021/0383973 A1* | 12/2021 | Matsumoto | ......... | C04B 35/6342 |
| 2022/0223346 A1* | 7/2022 | Morita | ................. | H01G 4/1227 |

FOREIGN PATENT DOCUMENTS

| JP | 2016169130 A | 9/2016 |
|---|---|---|
| WO | 2008105240 A1 | 9/2008 |

OTHER PUBLICATIONS

Extended European Search Report (EESR) dated Jun. 7, 2022, issued for European counterpart patent application No. EP21215987.5 (10 pages).
Lu Da-Yong et al., Electron Spin Resonance Investigations and Compensation Mechanism of Europium-Doped Barium Titanate Ceramics, Japanese Journal of Applied Physics, vol. 45, No. 11, Nov. 1, 2006, pp. 8782-8788 (8 pages).
Lu Da-Yong et al., Valence states and dielectric properties of fine-grained BaTiO3 ceramics co-doped with double valence-variable europium and chromium, Ceramic International, vol. 44, No. 12, Aug. 1, 2018, pp. 14717-14727 (11 pages).
Lu Da-Yong et al., X-ray photoelectron spetctroscopy study on Ba1-xEuxTiO3, Applied Surface Science, Elsevier, Amsterdam, vol. 242, No. 3-4, Apr. 14, 2005, pp. 318-325 (8 pages).

* cited by examiner

*Primary Examiner* — Dion R. Ferguson
(74) *Attorney, Agent, or Firm* — Law Office of Katsuhiro Arai

(57) ABSTRACT

A dielectric material includes a perovskite as a main phase, an A site of the perovskite including at least Ba, a B site of the perovskite including at least Ti, and Eu having +2 valence and +3 valence. A ratio of +2 valence of Eu is 21% or more.

15 Claims, 7 Drawing Sheets

DIELECTRIC MATERIAL, CERAMIC ELECTRONIC DEVICE, MANUFACTURING METHOD OF DIELECTRIC MATERIAL, AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2021-003742, filed on Jan. 13, 2021, the entire contents of which are incorporated herein by reference.

FIELD

A certain aspect of the present disclosure relates to a dielectric material, a ceramic electronic device, a manufacturing method of a dielectric material, and a manufacturing method of a ceramic electronic device.

BACKGROUND

Ceramic electronic devices such as multilayer ceramic capacitors are being used in devices for high frequency communication such as mobile phones, in order to remove noise. The devices need ceramic electronic devices having a small size (a thin size) and a large capacity. Ceramic electronic devices having a high rated voltage and high reliability are necessary in devices mounted on a vehicle. In order to meet the needs, a highly reliable dielectric material securing reliability even if electric field load per a single dielectric layer increases is necessary. And so, there is disclosed a technology in which a rare earth element is added to a perovskite (for example, see International Publication 2008/105240). An effect of Eu acting as a rare earth element is disclosed (for example, see Japanese Patent Application Publication No. 2016-169130).

SUMMARY OF THE INVENTION

However, since the load on the dielectric materials increases, the reliability is not sufficient. Means for further improving the reliability are requested.

According to a first aspect of the embodiments, there is provided a dielectric material including: a perovskite as a main phase, an A site of the perovskite including at least Ba, a B site of the perovskite including at least Ti; and Eu having +2 valence and +3 valence, wherein a ratio of +2 valence of Eu is 21% or more.

According to a second aspect of the embodiments, there is provided a ceramic electronic device including: a multilayer structure in which a plurality of dielectric layers and a plurality of internal electrode layers are alternately stacked, wherein a material of the plurality of dielectric layers is the dielectric material.

According to a third aspect of the embodiments, there is provided a manufacturing method of a dielectric material including: firing a dielectric material in which Eu is added to powder of a perovskite of which an A site includes at least Ba and of which a B site includes at least Ti; and annealing a fired dielectric material at a temperature lower than a temperature of the firing process and at an oxygen partial pressure lower than an oxygen partial pressure of the firing process, wherein a condition of the annealing process is adjusted so that a ratio of +2 valence of Eu is 21% or more.

According to a fourth aspect of the embodiments, there is provided a manufacturing method of a ceramic electronic device including: firing a multilayer structure in which a sheet of a dielectric material and a pattern of metal conductive paste are stacked, Eu being added to powder of a perovskite of the dielectric material, an A site of the perovskite including at least Ba, a B site of the perovskite including at least Ti; and annealing a fired multilayer structure at a temperature lower than a temperature of the firing and at an oxygen partial pressure lower than an oxygen partial pressure of the firing, wherein a condition of the annealing process is adjusted so that a ratio of +2 valence of Eu is 21% or more.

DETAILED DESCRIPTION

Hereinafter, an exemplary embodiment will be described with reference to the accompanying drawings.

Exemplary Embodiment

Figure 1:
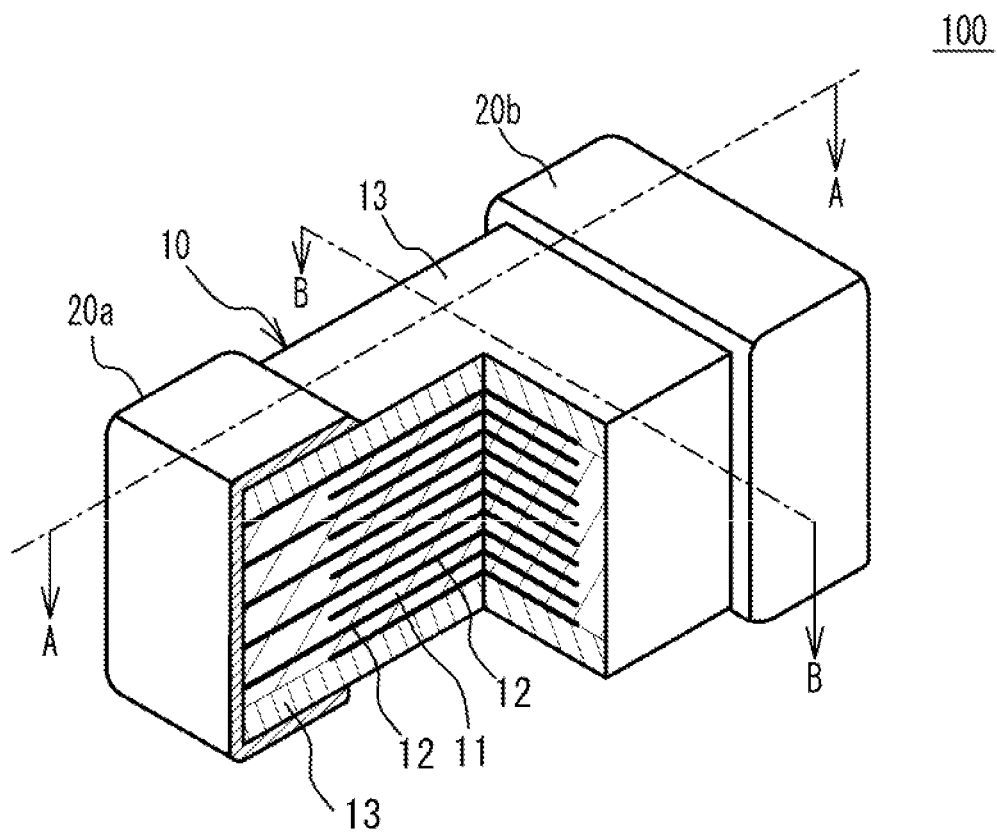
FIG. 1 is a partial cross-sectional perspective view of a multilayer ceramic capacitor.
Figure 2:
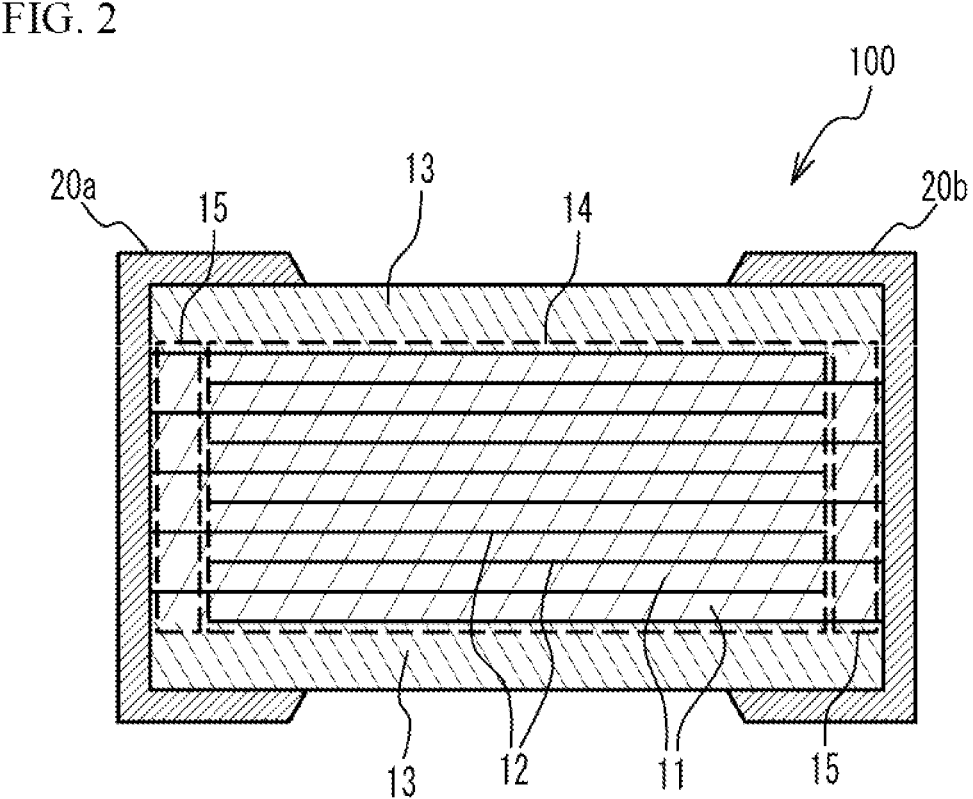
FIG. 2 is a cross-sectional view taken along line A-A in FIG. 1.
Figure 3:
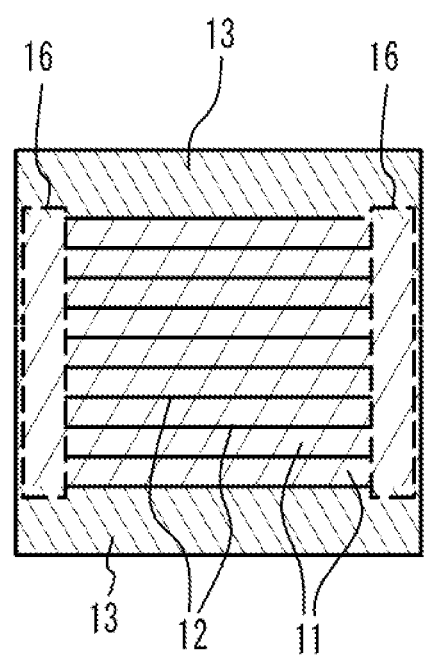
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

The dielectric layer 11 is mainly composed of a ceramic material having a perovskite structure expressed by a general formula $ABO_3$. The perovskite structure includes $ABO_3$-a having an off-stoichiometric composition. In the embodiment, an A site of the ceramic material includes at least Ba (barium), and a B site of the ceramic material includes at least Ti (titanium). The B site may include Zr (zirconium).

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

It is thought that a rare earth element is added to the dielectric layers 11 in order to improve the reliability of the dielectric layers 11. However, the rare earth element such as Ho (holmium), Dy (dysprosium), Y (yttrium), or the like tends to be solid-solved into the A site more than into the B site. When a large amount of the rare earth element is solid-solved into the B site, the amount of acceptors is excessive. This causes oxygen vacancy causing degradation of lifetime. Therefore, the improvement of lifetime is limited.

Therefore, the present inventors have studied a rare earth element having a large ionic radius which is easily solid-solved into the A site of $BaTiO_3$. The present inventors have found that Eu (europium) improves the high temperature load lifetime of the dielectric layers 11 more than other rare earth element such as Ho, Dy, Y or the like, by one digit or so.

Normally, the rare earth elements have a valence of +3. As a rare earth element of +3 valence, Eu is also used for modifying the perovskite. However, Eu has a special characteristic in a point that Eu has another stable valence of +2, in addition to +3. The present inventors have found that when the amount of Eu having the +2 valence, the high temperature load lifetime is remarkably improved. The factor of the effect of improving the lifetime is not solved yet. However, the Eu ion of +2 valence has the largest ionic radius in the rare earth elements which can be solid-solved into the A site. It is therefore thought that, with high possibility, the Eu ions largely distort the perovskite lattice and reduces the energy (activation energy) necessary for movement of the oxygen vacancy which may be a main factor of lifetime degradation. Actually, when the rare earth elements other Eu which are not capable of having the stable +2 valence are applied to the embodiment, the lifetime is not improved.

Table 1 shows ionic radiuses of rare earth elements of which a coordination number is 6. Exhibition of Table 1 is "R. D. Shannon, Acta Crystallogr., A32, 751(1976)".

TABLE 1

| | | IONIC RADIUS(Å) | |
|---|---|---|---|
| | VALENCE | COORDINATION NUMBER IS 6 | COORDINATION NUMBER IS 12 |
| Ba | +2 | | 1.610 |
| Ti | +4 | 0.605 | |
| Eu | +2 | 1.170 | |
| La | +3 | 1.032 | |
| Tm | +2 | 1.030 | |
| Yb | +2 | 1.020 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |
| Lu | +3 | 0.861 | |
| Sc | +3 | 0.745 | |

The present inventors have found that when an amount of Eu having +2 valence in the all of Eu added to the dielectric layers 11 is 21% or more, the lifetime of the dielectric layers 11 is improved and the reliability of the dielectric layers 11 is improved. It is thought that a large amount of Eu can be solid-solved into the A site.

From a viewpoint of improving the reliability of the dielectric layers 11, it is preferable that the ratio of Eu having +2 valence in all of Eu added to the dielectric layers 11 (the ratio of +2 valence) is 21% or more. It is more preferable that the ratio is 26% or more.

It is favorable to reduce a large amount of Eu having +3 valence into Eu having +2 valence, in order to increase the ratio of +2 valence. However, grain growth may occur in the dielectric layers 11 during reducing Eu having +3 valence into Eu having +2 valence in an annealing process for reducing Eu. When the grain growth occurs in the dielectric layers 11, the lifetime of the dielectric layers 11 may be degraded. Therefore, when the grain growth occurs in the dielectric layers 11, the effect of shortening the lifetime caused by the grain growth may cancel the effect of improving the lifetime caused by the +2 valence of Eu. The grain growth may crush the structure of the internal electrode layers 12. This may cause short. It is therefore preferable that the ratio of +2 valence of Eu has an upper limit. For example, it is preferable that, in the dielectric layers 11, the ratio of +2 valence of Eu is 80% or less. It is more preferable that the ratio is 70% or less. It is still more preferable that the ratio is 59% or less.

When the A site of the perovskite forming the main phase of the dielectric layers 11 has vacancies, a sufficient amount of vacancy is formed in the A site. And, Eu having a large ionic radius and +2 valence is easily solid-solved into the A site. It is therefore preferable that the A site has vacancies. For example, it is preferable that an atomic concentration ratio of the A site/the B site in the perovskite forming the main phase of the dielectric layers 11 is 0.980 or less. It is more preferable that the atomic concentration ratio is 0.970 or less. It is still more preferable that the atomic concentration ratio is 0.960 or less. When the A site element is only Ba and the B site element is only Ti, the atomic concentration ratio of the A site/the B site is the atomic concentration ratio of Ba/Ti. When the A site element is only Ba and the B site element is only Ti and Zr, the atomic concentration ratio of the A site element/the B site element is the atomic concentration ratio of Ba/(Ti+Zr).

When the atomic concentration ratio of the A site/the B site is excessively small, the dielectric constant of the dielectric layers 11 may be reduced because the tetragonal characteristic is degraded. It is preferable that the atomic concentration ratio of the A site/the B site has a lower limit. It is preferable that the atomic concentration ratio of the A site/the B site in the perovskite forming the main phase of the dielectric layers 11 is 0.920 or more. It is more preferable that the atomic concentration ratio is 0.940 or more. It is still more preferable that the atomic concentration ratio is 0.950 or more.

The perovskite forming the main phase of the dielectric layers 11 can maintain insulation characteristic when the B site includes Zr. From a viewpoint of achieving sufficient effect of maintaining insulation characteristic, it is preferable that the Zr/Ti ratio (atomic concentration ratio) has a lower limit. It is preferable that the Zr/Ti ratio is 0.01 or more. It is more preferable that the Zr/Ti ratio is 0.02 or more. It is still more preferable that the Zr/Ti ratio is 0.04 or more.

When the amount of Zr is excessively large in the case where the B site of the perovskite forming the main phase of the dielectric layers 11 includes Zr, grain growth may occur during the firing of the dielectric layers 11. And long lifetime may not be necessarily achieved. It is preferable that the Zr/Ti ratio has an upper limit. For example, it is preferable that the Zr/Ti ratio is 0.14 or less. It is more preferable that the Zr/Ti ratio is 0.10 or less. It is still more preferable that the Zr/Ti ratio is 0.08 or less.

When the amount of Eu added to the dielectric layers 11 is excessively small, sufficient lifetime may not be necessarily achieved. And so, it is preferable that the amount of Eu added to the dielectric layers 11 has a lower limit. For example, it is preferable that an atomic concentration ratio of Eu with respect to the amount of the B site element (Eu/B site) in the dielectric layers 11 is 0.001 or more. It is more preferable that the atomic concentration ratio is 0.005 or more. It is still more preferable that the atomic concentration ratio is 0.010 or more. When the B site element is only Ti, the atomic concentration ratio (Eu/B site) means Eu/Ti. When the B site element is Ti and Zr, the atomic concentration ratio (Eu/B site) means the atomic concentration ratio Eu/(Ti+Zr).

When the amount of Eu is excessively large in the dielectric layers 11, the insulation characteristic may be degraded and sufficient lifetime may not be necessarily achieved. It is therefore preferable that the amount of Eu added to the dielectric layers 11 has an upper limit. For example, it is preferable that the atomic concentration ratio of Eu/B site is 0.100 or less. It is more preferable that the atomic concentration ratio is 0.060 or less. It is still more preferable that the atomic concentration ratio is 0.040 or less.

When the amount of rare earth elements other than Eu is excessively large in the dielectric layers 11, the effect of improving the lifetime gets smaller. And, sufficient lifetime may not be necessarily achieved. It is therefore preferable that the amount of the rare earth elements other than Eu has an upper limit. In concrete, it is preferable that the amount of the rare earth element other than Eu is smaller than the amount of Eu. When the number of the types of the rare earth element other than Eu is two or more, it is preferable that the total amount of the rare earth elements is smaller than the amount of Eu.

Figure 4:
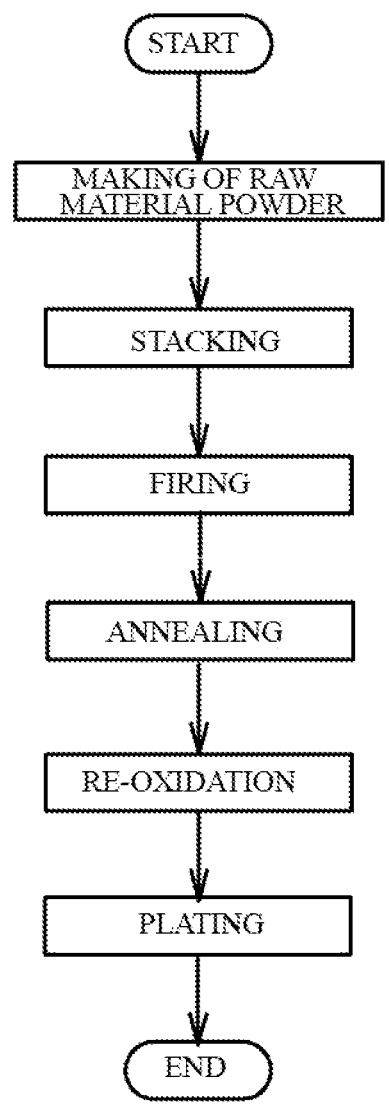
FIG. 4 is a flowchart of a method of manufacturing a multilayer ceramic capacitor.

Next, the manufacturing method of the multilayer ceramic capacitor 100 will be described. FIG. 4 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Zr (zirconium), Mg (magnesium), Mn (manganese), V (vanadium), Cr (chromium) or Eu (europium), or an oxide of Co (cobalt), Ni (nickel), Li (lithium), B (boron), Na (sodium), K (potassium) or Si (silicon), or glass. If necessary, an oxide of a rare earth element other than Eu. The rare earth element is such as Sc (scandium), Y (yttrium), La (lanthanum), Ce (cerium), Pr (praseodymium), Nd (neodymium), Pm (promethium), Sm (samarium), Gd (gadolinium), Tb (terbium), Dy (dysprosium), Ho (holmium), Er (erbium), Tm (thulium), Yb (ytterbium), or Lu (lutetium).

For example, a compound including an additive is wet-blended with the resulting ceramic material powder. The resulting ceramic material powder is dried and crushed. For example, the resulting ceramic material is crushed if necessary. Thus, a particle diameter is adjusted. Alternatively, the particle diameter may be further adjusted by a classification process. Thus, a dielectric material is obtained.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of, for example, 0.5 µm or more is painted on a base material by, for example, a die coater method or a doctor blade method, and then dried.

Next, an internal electrode layer pattern is formed on the surface of the dielectric green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain diameter is 50 nm or less may be evenly dispersed.

After that, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are clamped on the upper face and the lower face of the stacked dielectric green sheets in the stacking direction. And, the resulting multilayer structure is cut into a predetermined chip size (for example, 1.0 mm×0.5 mm).

[Firing Process]

The binder is removed from the resulting ceramic multilayer structure in $N_2$ atmosphere. After that, Ni paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ atm in a temperature range of 1160° C. to 1280° C. for 5 minutes to 10 minutes.

[Annealing Process]

After that, an annealing process is performed at a temperature which is lower than that of the firing process and in an atmosphere which is more reductive than that of the firing process. For example, the annealing process is performed at an oxygen pressure of $10^{-14}$ MPa to $10^{-13}$ MPa, in a reductive atmosphere of 1100 degrees C. to 1150 degrees C., for 1 hour to 2 hours. It is preferable that the temperature of the annealing process is lower than the maximum temperature of the firing process by approximately 50 degrees C.

When the annealing process of which the atmosphere is more reductive than that of the firing process is performed, it is possible to reduce Eu of +2 valence into +3 valence. The condition of the annealing process may be adjusted so that the ratio of +2 valence becomes 21% or more.

During the firing process, it is possible to reduce Eu in the strong reductive atmosphere like the annealing process. However, in this case, the barium titanate acting as the main phase of the dielectric layer 11 may be reduced. And, a large amount of oxygen vacancy and a large amount of electron may be generated. The oxygen vacancy is a main factor of shortening the lifetime of the dielectric layer 11. Therefore, the reliability may be further degraded. Actually, when the atmosphere which sufficiently reduces Eu into +2 valence is used, the barium titanate itself is strongly reduced. In this case, the barium titanate may become an n-type semiconductor. When the barium titanate is subjected to a high temperature in the strong reductive atmosphere for a long time, the grains of the barium titanate grow. In this case, the internal electrode layers 12 may be broken. And, the capacity may be degraded. It may be possible to achieve the resistance to reduction of the barium titanate and reduction of Eu, by strictly designing the condition of the high temperature firing and controlling the furnace atmosphere with high accuracy. However, the process is not a general process for mass-producing multilayer ceramic capacitors. The process for reducing Eu is not limited. However, a process including the above-mentioned strong reductive annealing in the temperature falling process is proposed in order to securely achieving the effect of improving the lifetime. The method for increasing the ratio of +2 valence of Eu is not limited to the above-mentioned method.

[Re-Oxidation Process]

In order to return the oxygen into the barium titanate acting as the main phase of the dielectric layers 11 which are fired in the reductive atmosphere and is partially reduced, a thermal process may be performed in a mixed gas of $N_2$ and moisture at approximately 1000 degrees C. or in a normal atmosphere at 500 degrees C. to 700 degrees C. so that the internal electrode layers 12 are not oxidized. The process is called a re-oxidation process. However, the general re-oxidation process is performed, Eu having +2 valence may be oxidized into +3 valence.

Accordingly, in the embodiment, the re-oxidation process is performed in $N_2$ gas atmosphere at approximately 900 degrees C. When the re-oxidation process having a weak oxidizing condition, it is possible to return oxygen into barium titanate while the high ratio of +2 valence of Eu is kept.

[Plating Process]

After that, metal layers such as Cu, Ni, Sn or the like may be formed on the base layers of the external electrodes 20a and 20b by plating. With the processes, the multilayer ceramic capacitor 100 is fabricated.

It is possible to evaluate the ratio of +2 valence of Eu of the dielectric layers 11 by using XANES (X-ray Absorption Near Edge Structure) or the like. In concrete, spectrum near L3 absorption edge of Eu (6977 eV) is obtained by a fluorescence method using a synchrotron light source. A background is removed. The ratio of +2 valence (%) is calculated from a ratio of a peak area of +2 valence (hatch is illustrated) and a peak area of +3 valence (hatch is illustrated). The ratio of the peak areas is expressed as follows.

(peak area of+2valence)/{(peak area of+2valence)+ (peak area of+3valence)}×100(%)  (1)

The ratio of +2 valence of Eu may be measured from a multilayer ceramic capacitor. Alternatively, powder is obtained by crushing the multilayer ceramic capacitor, and the powder may be deformed into a shape which is appropriate for a sample for the evaluation. The shape may be a bulk body which is a compact of a disc or a rectangular board of the dielectric material and is fired together with the multilayer ceramic capacitor.

EXAMPLES

The multilayer ceramic capacitors in accordance with the embodiment were made. And, property of the multilayer ceramic capacitors was measured.

(Example 1) Barium titanate powder was prepared as a dielectric material. Additives such as $ZrO_2$, Eu oxide, $MnCO_3$, $SiO_2$ were added to the barium titanate powder. The dielectric material and the additives were mixed and crushed with use of zirconia bead of φ of 0.5 mm. Thus, the dielectric material was obtained. 1.0 mol of Eu was added with respect to 100 mol of a main phase ($BaTiZrO_3$). 0.5 mol of $MnCO_3$ was added with respect to 100 mol of the main phase ($BaTiZrO_3$). 1.0 mol of $SiO_2$ was added with respect to 100 mol of the main phase ($BaTiZrO_3$). Ba/(Ti+Zr) was 0.960.

An organic binder and a solvent were added to the resulting dielectric material. With use of the resulting slurry, dielectric green sheets were made by a doctor blade method. Polyvinyl butyral (PVB) or the like was used as the organic binder. Ethanol, toluene or the like was used as the solvent. And a plasticizer was added to the resulting dielectric material.

Next, metal conductive paste for forming internal electrode layers was made with use of a planetary ball mill. The metal conductive paste included Ni acting as the main component metal of the internal electrode layers 12, the co-material, a binder (ethyl cellulose), a solvent, and an additive when necessary.

The metal conductive paste for forming internal electrode layers was printed on each of the dielectric green sheets by a screen printing. Sheet members in which the metal conductive paste was printed on the dielectric green sheet were stacked. Cover sheets were stacked on the stacked green sheets and under the stacked green sheets. After that, a multilayer structure was obtained by a thermal clamping. The multilayer structure was cut into a predetermined shape.

The binder was removed from the resulting multilayer structure in $N_2$ atmosphere. After that, the metal conductive paste including a metal filler of which a main component is Ni, the co-material, the binder, the solvent and so on was painted from both edge faces of the multilayer structure to each side faces and was dried. The metal conductive paste for base layers and the multilayer structure were fired in a reducing atmosphere at a temperature of 1200° C. for 10 minutes and at an oxygen partial pressure of $10^{-10}$ MPa. The oxygen partial pressure was adjusted by a mixture ratio of $N_2$—$H_2$-$H_2O$. After that, the temperature was changed to 1140 degrees C. The oxygen partial pressure was changed to $10^{-13}$ MPa. The atmosphere was kept for 2 hours. Thus, the annealing process was finished. After that, the re-oxidation process was performed in $N_2$ gas atmosphere at approximately 900 degrees C.

The size of the multilayer ceramic was 1005 size (The length, the width and the height of the sintered structure were 1.0 mm, 0.5 mm and 0.5 mm). The average thickness of the dielectric layers was 2.0 μm. The stacked number of the internal electrode layers was 100.

(Example 2) The temperature of the annealing process was 1150 degrees C. in an example 2. Other conditions were the same as those of the example 1.

(Example 3) The temperature of the annealing process was 1160 degrees C. in an example 3. Other conditions were the same as those of the example 1.

(Example 4) The oxygen partial pressure of the annealing process was $10^{-14}$ MPa. Other conditions were the same as those of the example 1.

(Example 5) The temperature of the annealing process was 1150 degrees C., and the oxygen partial pressure of the annealing process was $10^{-14}$ MPa in an example 5. Other conditions were the same as those of the example 1.

(Example 6) The temperature of the annealing process was 1160 degrees C., and the oxygen partial pressure of the annealing process was $10_{-14}$ MPa, in an example 6. Other conditions were the same as those of the example 1.

(Example 7) The temperature of the annealing process was 1150 degrees C., and Ba/(Ti+Zr) was 0.940, in an example 7. Other conditions were the same as those of the example 1.

(Example 8) The temperature of the annealing process was 1150 degrees C., and Ba/(Ti+Zr) was 0.920, in an example 8. Other conditions were the same as those of the example 1.

(Example 9) The temperature of the annealing process was 1150 degrees C., and Ba/(Ti+Zr) was 0.980, in an example 9. Other conditions were the same as those of the example 1.

(Comparative example 1) The annealing process was not performed in a comparative example 1. Other conditions were the same as those of the example 1.

(Comparative example 2) The time period of the firing process was 20 minutes in a comparative example 2. Other conditions were the same as those of the example 9.

(Comparative example 3) La was used instead of Eu, in a comparative example 3. Other conditions were the same as those of the example 2.

(Comparative example 4) Gd was used instead of Eu, in a comparative example 4. Other conditions were the same as those of the example 2.

(Comparative example 5) Dy was used instead of Eu, in a comparative example 5. Other conditions were the same as those of the example 2.

(Comparative example 6) Ho was used instead of Eu, in a comparative example 6. Other conditions were the same as those of the example 2.

(Comparative example 7) Er was used instead of Eu, in a comparative example 7. Other conditions were the same as those of the example 2.

Figure 5:
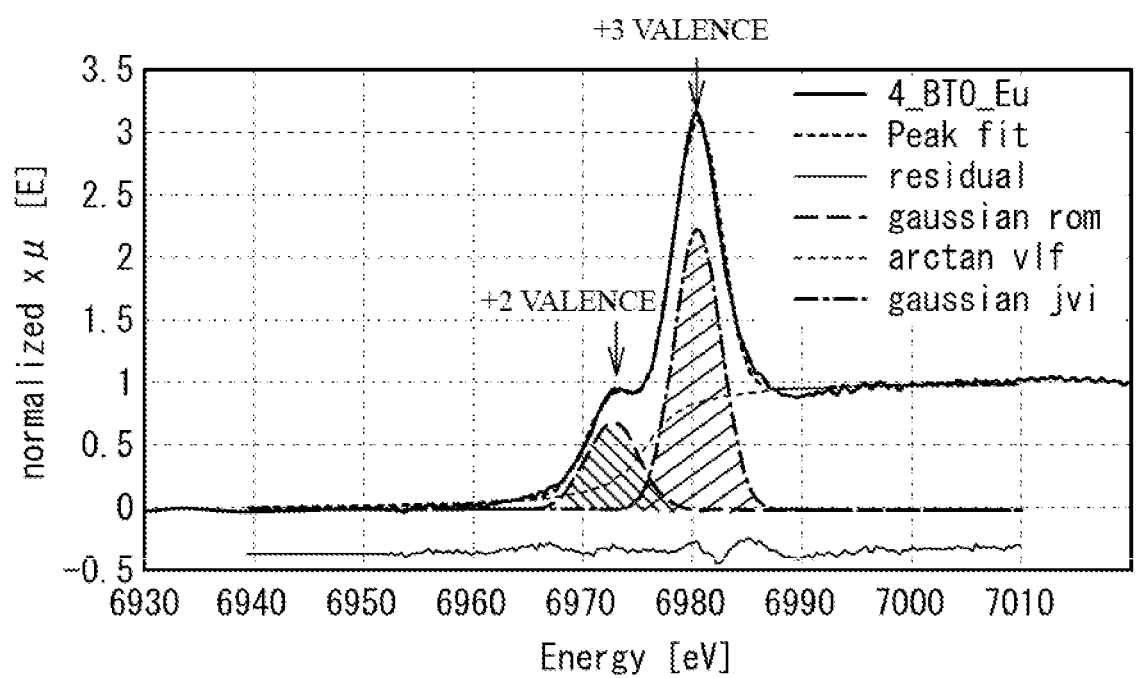
FIG. 5 illustrates XANES spectrum near L3 absorption edge of Eu with respect to an example 2.
Figure 6:
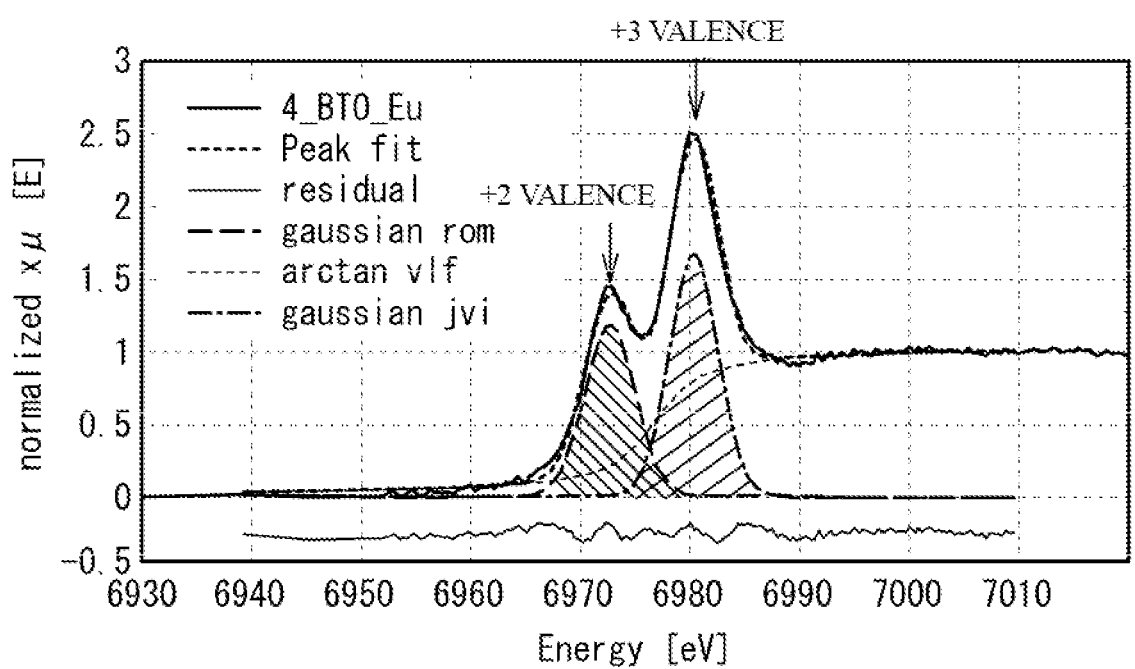
FIG. 6 illustrates XANES spectrum near L3 absorption edge of Eu with respect to an example 5.

(Evaluation of the valence) The ratio of +2 valence of Eu in the dielectric layers was evaluated with respect to each of the examples 1 to 9 and the comparative examples 1 and 2. The ratio of +2 valence of Eu was evaluated by using XANES. FIG. 5 illustrates XANES spectrum near the L3 absorption edge of Eu (6977 eV) with respect to the example 2. In addition to +3 valence, a peak of +2 valence clearly appears. From the result of FIG. 5, in the example 2, the ratio of +2 valence was 26%. FIG. 6 illustrates XANES spectrum near the L3 absorption edge of Eu (6977 eV) with respect to the example 5. From the result of FIG. 6, in the example 5, the ratio of +2 valence was 43%.

The ratio of +2 valence of the example 1 was 21%. The ratio of +2 valence of the example 3 was 29%. The ratio of +2 valence of the example 4 was 32%. The ratio of +2 valence of the example 6 was 59%. The ratio of +2 valence of the example 7 was 28%. The ratio of +2 valence of the example 8 was 27%. The ratio of +2 valence of the example 9 was 24%. Table 2 shows the results. From the results, the ratio of +2 valence was high when the temperature of the atmosphere during the annealing process was high or the oxygen partial pressure of the atmosphere during the annealing process was low.

examples 7 and 8 is superior to that of the example 2. It is thought that this is because Ba/(Ti+Zr) of the examples 7 and 8 was smaller than that of the example 2, the amount of vacancy of the A site increased, and the amount of the solid-solved Eu increased.

(Evaluation of dielectric constant) With respect to each of the examples 1 to 9 and the comparative examples 1 to 7, the dielectric constant and tanδ were measured. Table 2 shows the results. When the comparative example 1 is compared with the example 1, a large difference does not occur in the dielectric constant and the tanδ. Therefore, even if the

| SAMPLE | RARE EARTH ELEMENT | CONDITION OF ANNEALING | Ba/(Ti + Zr) | DIELECTRIC CONSTANT (%) | tan δ (%) | RATIO OF +2 VALENCE | RELATIVE LIFETIME |
|---|---|---|---|---|---|---|---|
| COMPARATIVE EXAMPLE 1 | Eu | — | 0.960 | 3500 | 3.8 | 4 | 1.0 |
| EXAMPLE 1 | Eu | 1140° C., $10^{-13}$ MPa | 0.960 | 3500 | 3.8 | 21 | 6.6 |
| EXAMPLE 2 | Eu | 1150° C., $10^{-13}$ MPa | 0.960 | 3400 | 4.0 | 26 | 10.8 |
| EXAMPLE 3 | Eu | 1160° C., $10^{-13}$ MPa | 0.960 | 3300 | 4.2 | 29 | 21.1 |
| EXAMPLE 4 | Eu | 1140° C., $10^{-14}$ MPa | 0.960 | 3400 | 4.0 | 32 | 37.6 |
| EXAMPLE 5 | Eu | 1150° C., $10^{-14}$ MPa | 0.960 |  | 4.1 | 43 | 68.2 |
| EXAMPLE 6 | Eu | 1160° C., $10^{-14}$ MPa | 0.960 | 3800 | 4.6 | 59 | 73.3 |
| EXAMPLE 7 | Eu | 1150° C., $10^{-13}$ MPa | 0.940 | 3300 | 3.8 | 28 | 12.0 |
| EXAMPLE 8 | Eu | 1150° C., $10^{-13}$ MPa | 0.920 | 2900 | 3.1 | 27 | 15.7 |
| EXAMPLE 9 | Eu | 1150° C., $10^{-13}$ MPa | 0.980 | 3900 | 4,9 | 24 | 5.0 |
| COMPARATIVE EXAMPLE 2 | Eu | 1150° C., $10^{-13}$ MPa | 0.980 | 4100 | 5.4 | 18 | 4.1 |
| COMPARATIVE EXAMPLE 3 | La | 1150° C., $10^{-13}$ MPa | 0.960 | 2900 | 3.2 | — | 0.3 |
| COMPARATIVE EXAMPLE 4 | Gd | 1150° C., $10^{-13}$ MPa | 0.960 | 3300 | 3.6 | — | 0.1 |
| COMPARATIVE EXAMPLE 5 | Dy | 1150° C., $10^{-13}$ MPa | 0.960 | 3400 | 3.8 | — | 0.2 |
| COMPARATIVE EXAMPLE 6 | Ho | 1150° C., $10^{-13}$ MPa | 0.960 | 3400 | 3.9 | — | 0.1 |
| COMPARATIVE EXAMPLE 7 | Er | 1150° C., $10^{-13}$ MPa | 0.960 | 3600 | 4.4 | — | 0.1 |

(Method for evaluating lifetime) With respect to each of the examples 1 to 9 and the comparative examples 1 to 7, a mean time to failure of highly-accelerated lifetime test (125 degrees C. and 50 V/μm) was measured as a lifetime. The lifetime of the sample (the comparative example 1) made by adding Eu through the normal firing condition was considered as 1.0. Ratios of lifetimes with respect to the lifetime of the comparative example 1 were measured with respect the examples 1 to 9 and the comparative examples 2 to 7. Table 1 shows the results. When the measured lifetime of a sample of the ratio is five times or more, the sample was determined as good because the lifetime was sufficiently long. When the measured lifetime of a sample of the ratio is less than five times, the sample was determined as bad because the lifetime was not sufficiently long.

Figure 7:
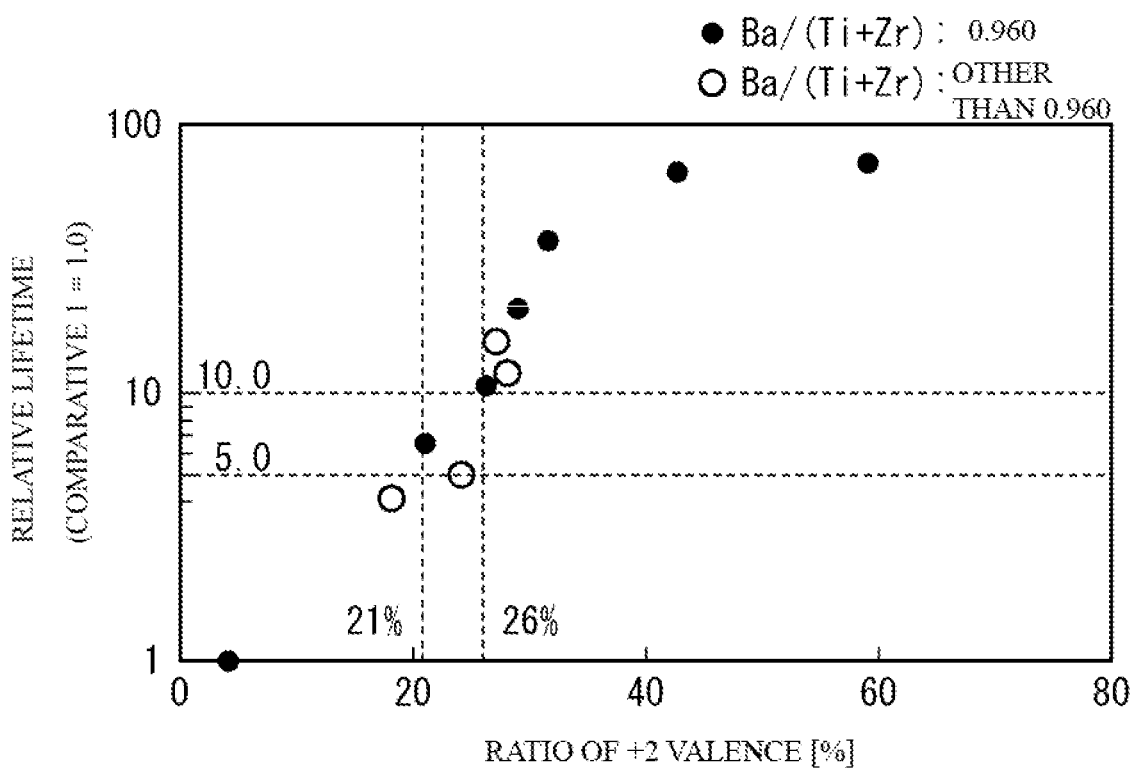
FIG. 7 illustrates a relationship between a ratio of +2 valence of Eu and a lifetime.

FIG. 7 illustrates a relationship between the ratio of +2 valence of Eu and the lifetime. As illustrated in FIG. 7, when the ratio of +2 valence is 21% or more, the lifetime becomes 5 times as that of the comparative example 1 or more. When the ratio of +2 valence is 26% or more, the lifetime becomes 10 times as that of the comparative example 1 or more.

In comparison, the lifetimes of the comparative examples 3 to 7 were not long. From the results, rare earth elements other than Eu do not withstand the high load such as 125 degrees C. and 50 V/m. It is thought that this is because the stable valence of the rare earth elements other than Eu is +3 and the valence of the rare earth elements is not changed into +2.

When the examples 7 and 8 are compared with the example 2, the effect of improving the lifetime of the annealing process is performed, remarkable structure change such as grain growth does not occur. When the comparative example 1 is compared with the example 2, a large difference does not occur in the dielectric constant and the tanδ. Therefore, even if the annealing process of the example 2 is performed, remarkable structure change such as grain growth does not occur.

In the example 6, the dielectric constant and tan δ increased. An indication of the grain growth appeared. When the reduction process is progressed more than the example 6, the structure may be changed. It is therefore preferable that the ratio of +2 valence of Eu is 59% or less.

When the example 7 was compared with the example 8, lowering of the dielectric constant of the example 8 started. This means that the capacity may be reduced even if long lifetime is secured. It is therefore preferable that Ba/(Ti+Zr) is 0.940 or more.

When the example 1 is compared with the comparative example 2, the difference of the ratios of +2 valence was small. However, the relative lifetime of the comparative example 2 was not 5.0 times or more. The dielectric constant and tanδ of the comparative example 2 were larger than those of the example 1. It is thought that this means grains of the barium titanate grew and the effect of shortening lifetime caused by the grain growth cancels the effect of the ratio of +2 valence. It is thought that when Ba/(Ti+Zr) gets close to 1.000 of stoichiometry, the reactivity of barium titanate rapidly increases. It is therefore preferable that Ba/(Ti+Zr) is 0.960 or less.

Although the embodiments of the present invention have been described in detail, it is to be understood that the various change, substitutions, and alterations could be made hereto without departing from the spirit and scope of the invention.

What is claimed is:

1. A dielectric material comprising:
    a perovskite as a main phase, an A site of the perovskite including at least Ba, a B site of the perovskite including at least Ti; and
    Eu having +2 valence and +3 valence, wherein a ratio of +2 valence of Eu is 21% or more and 43% or less.

2. The dielectric material as claimed in claim 1, wherein the ratio of +2 valence of Eu is 26% or more.

3. The dielectric material as claimed in claim 1, wherein the ratio of +2 valence of Eu is 29% or more.

4. The dielectric material as claimed in claim 1, wherein the ratio of +2 valence of Eu is 32% or more.

5. The dielectric material as claimed in claim 1, wherein an atomic concentration ratio of the A site/the B site in the perovskite is 0.980 or less.

6. The dielectric material as claimed in claim 1, wherein an atomic concentration ratio of the A site/the B site in the perovskite is 0.970 or less.

7. The dielectric material as claimed in claim 1, wherein an atomic concentration ratio of the A site/the B site in the perovskite is 0.960 or less.

8. The dielectric material as claimed in claim 1, wherein an atomic concentration ratio of the A site/the B site in the perovskite is 0.920 or more.

9. The dielectric material as claimed in claim 1, wherein an atomic concentration ratio of the A site/the B site in the perovskite is 0.940 or more.

10. The dielectric material as claimed in claim 1, wherein an atomic concentration ratio of the A site/the B site in the perovskite is 0.950 or more.

11. The dielectric material as claimed in claim 1, wherein an atomic concentration ratio of Eu/the B site is 0.001 or more.

12. The dielectric material as claimed in claim 1, wherein an atomic concentration ratio of Eu/the B site is 0.100 or less.

13. A ceramic electronic device comprising:
    a multilayer structure in which a plurality of dielectric layers and a plurality of internal electrode layers are alternately stacked,
    wherein a material of the plurality of dielectric layers is the dielectric material as claimed in claim 1.

14. A manufacturing method of a dielectric material comprising:
    firing a dielectric material in which Eu is added to powder of a perovskite of which an A site includes at least Ba and of which a B site includes at least Ti; and
    annealing a fired dielectric material at a temperature lower than a temperature of the firing process and at an oxygen partial pressure lower than an oxygen partial pressure of the firing process,
    wherein a condition of the annealing process is adjusted so that a ratio of +2 valence of Eu is 21% or more.

15. A manufacturing method of a ceramic electronic device comprising:
    firing a multilayer structure in which a sheet of a dielectric material and a pattern of metal conductive paste are stacked, Eu being added to powder of a perovskite of the dielectric material, an A site of the perovskite including at least Ba, a B site of the perovskite including at least Ti; and
    annealing a fired multilayer structure at a temperature lower than a temperature of the firing and at an oxygen partial pressure lower than an oxygen partial pressure of the firing,
    wherein a condition of the annealing process is adjusted so that a ratio of +2 valence of Eu is 21% or more.

* * * * *